C. H. BELL.
TYPE WRITING MACHINE.
APPLICATION FILED SEPT. 11, 1905.

1,035,409.

Patented Aug. 13, 1912.
7 SHEETS—SHEET 2.

Fig. 2.

Witnesses:
Albert Dick
A. Katherine Dick

Inventor
Charles H. Bell
By F.W. Hillard
Attorney

C. H. BELL.
TYPE WRITING MACHINE.
APPLICATION FILED SEPT. 11, 1905.

1,035,409.

Patented Aug. 13, 1912.

Witnesses:
Albert Dick
A. Katherine Dick

Inventor
Charles H. Bell
By F. W. Hillard
Attorney

UNITED STATES PATENT OFFICE.

CHARLES H. BELL, OF THOMASTON, CONNECTICUT, ASSIGNOR TO FREDERIC W. HILLARD, OF TOTTENVILLE, NEW YORK.

TYPE-WRITING MACHINE.

1,035,409.

Specification of Letters Patent.

Patented Aug. 13, 1912.

Application filed September 11, 1905. Serial No. 277,965.

*To all whom it may concern:*

Be it known that I, CHARLES H. BELL, a resident of Thomaston, in the county of Litchfield and State of Connecticut, have invented certain new and useful Improvements in Type-Writing Machines, of which the following is a specification.

My invention is an improvement in typewriting machines and embraces the arrangement and construction of a carriage and type bar system and connections which are especially adapted for use in a front strike typewriter.

It further consists in the various details of construction described in the specification and particularly pointed out in the claims.

In the drawings, which form a part of the specification, only such parts of the machine are shown as are necessary or convenient to illustrate the invention, and many of the parts are broken away in section, or removed, for clearness of illustration in the several views.

Fig. 10 is a perspective view of the rock shaft for the K type bar, removed from the machine and from its tubular bearing therein. Figs. 10$^a$ and 10$^b$ are enlarged detail views of the left hand end of the rock shaft of Fig. 10, and of the rocker arm $b$ thereof. Fig. 11 is a similar view of the rock shaft for the I type bar. Figs. 11$^a$, 11$^b$, 11$^c$ and 11$^d$ are enlarged detail views of the right hand end of the rock shaft of Fig. 11 and of the rocker arm *b* thereof. Fig. 12 is a similar view of the rock shaft for the 8 type bar. Figs. 13ª, 13ᵇ, 13ᶜ and 13ᵈ are enlarged detail views of the right hand end of the rock shaft of Fig. 13.

In the drawings I have not shown the carriage propelling power nor the escapement mechanism; and I have only shown a part of the ribbon holding and guiding mechanism. Any of the numerous well known mechanisms for performing these functions may be used.

Mounted in the base frame 1 are the key levers 2, the latter being pivoted at the rear of the machine back of the platen and type bar system, and passing thence forward in the horizontal plane of the machine, terminate in the usual banks of keys at the front of the machine. At their front ends the key levers are provided with the keys 3, arranged in banks in the usual order of the Remington standard key board. At their rear ends the key levers are pivoted on the usual fulcrum bar 4 and are supported normally in their elevated positions by the usual key lever springs 5 (the fulcrum bar and key lever springs being shown in dotted lines in Figs. 4 and 5). The upward movement of the key levers is limited by the usual buffer 6.

At either side of the system of key levers there are located the usual shift key levers 7, having at their front ends the lower case shift keys 8; and outside of the shift key levers are the space bar levers 9, which are attached at their front ends to the usual space bar 10. The key lever system, including the shift keys and space bar, are of the well known Remington style, and they are inclosed in a base frame, which, in so far as the key lever is concerned, may be similar to that of the Remington typewriter; although I have shown supporting brackets for the type bar system and carriage frame that are not found in the Remington machine.

I preferably use a key lever system of the exact width of that of the Remington typewriter, and in which the key levers, their keys, fulcrum and key lever springs are preferably precisely similar to the corresponding parts in the Remington typewriter.

There are three brackets on each side of the base frame that together support the carriage and control it at the proper printing level, and one supporting bracket for the type bar system on either side of the base frame. The pair of rearmost brackets 11, at their upper ends form the pivotal supports for the rear carriage rocker rail 12. The pair 13, next in front of the brackets 11, at their upper ends form the pivotal support for the front carriage rocker rail 14. Next in front of the brackets 13, on the base frame, is the pair of brackets 15, having the lugs 16 that serve to limit the upper case and lower case shifting movements of the platen and carriage. And in front of the brackets 15 is the pair of brackets 17 which serve as the supports for fastening the frame of the type bar system rigidly to the base frame. The usual cross bar 18 extends across the base frame transversely and forms the support for the key lever buffer 6.

Figures 5, 14, 15:
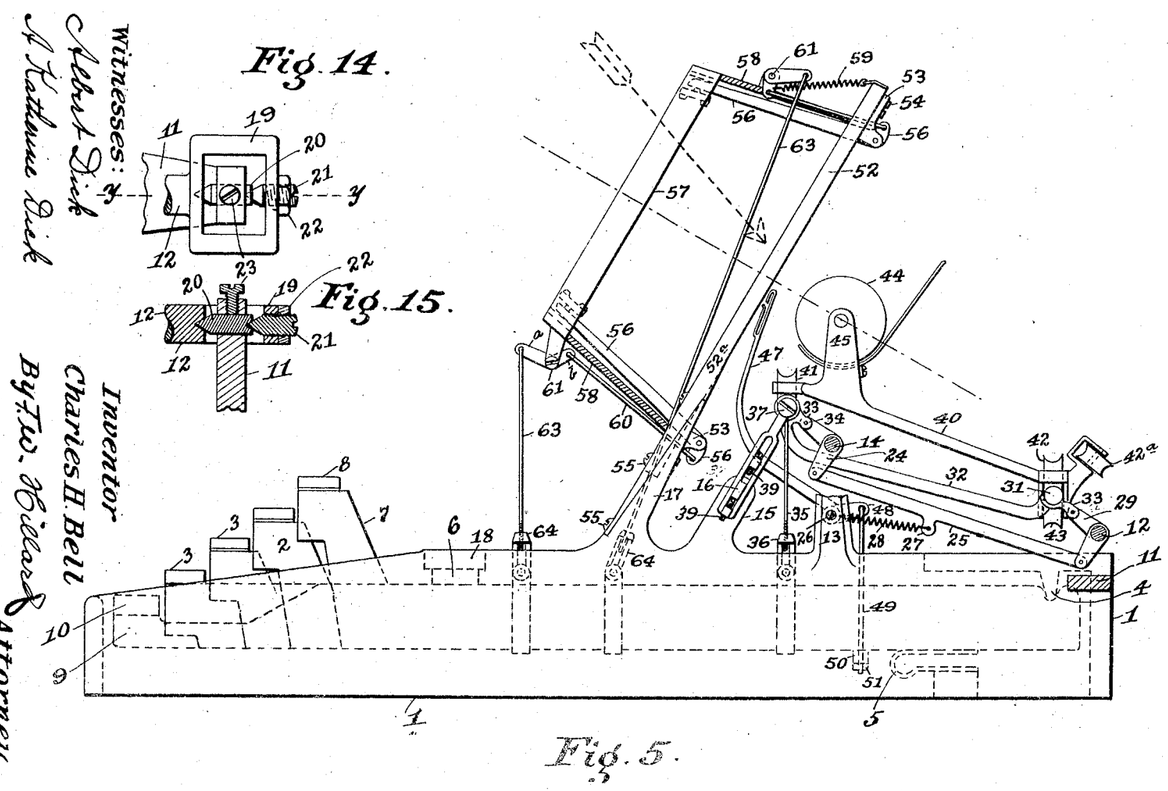
Fig. 5 is a side view similar to Fig. 3, excepting that the carriage is shown in full lines in its lower case printing position; the type bars are all in their normal positions of rest, and the ribbon holding and guiding mechanism is swung forward and down in its normal position, so as to hold the ribbon down and forward out of line of the view between the operators and the printing point at the platen. The line of vision is indicated by the large dotted arrow in this view and in Fig. 3.
Figs. 14 and 15 are enlarged views of one of the hollow, open, square frames that are provided at both ends of each rocker rail, and which constitute a device for maintaining the rails at their proper levels and thus the platen at the proper printing levels, for taking up the end play of the rails and for varying the position of the rails transversely in the base frame.
Figure 6:
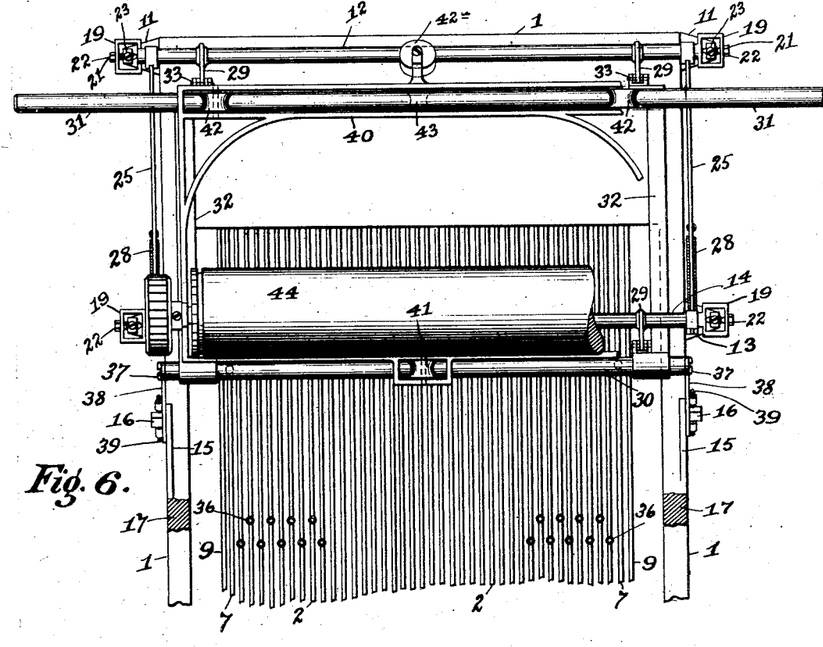
Fig. 6 is a plan view of the carriage, supported on the machine above the base frame and system of key levers, which latter pass underneath the carriage to the front of the machine, being pivoted at the rear edge of the machine. In this view the machine is broken off to the rear of the type bar system.
Figure 7:
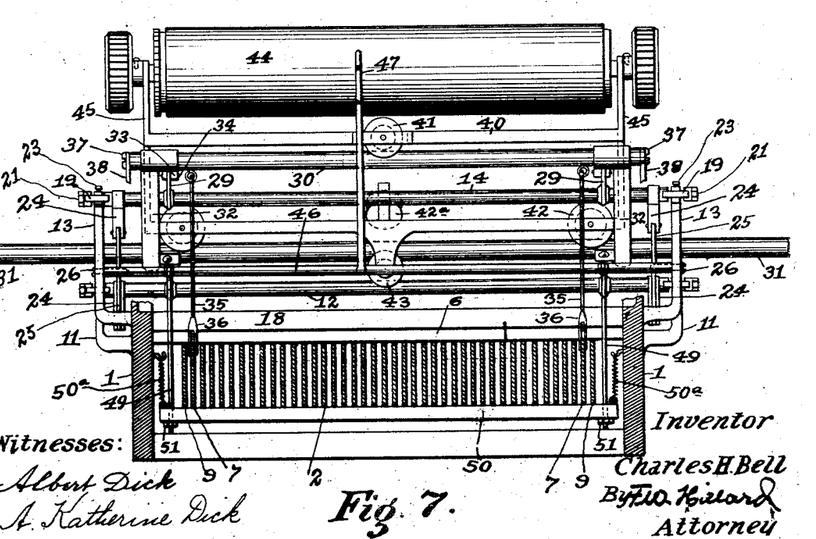
Fig. 7 is a cross section of the machine, taken at about the same line as that at which the machine is broken off in Fig. 6, and illustrates the front view of the carriage and its supports and running gear, mounted in the machine above the base frame and key levers.

The front and rear carriage rocker rails are each provided with square, hollow, open frames 19; the two such frames on the ends of the rail 12 being adapted and arranged to take over and inclose the upper ends of the fixed supports or rear brackets 11, and the two such frames on the ends of the front rail 14 being similarly arranged to take over and inclose the upper ends of the fixed supports or brackets 13. Referring particularly to Fig. 15, it will be seen that the upper end of the inclosed bracket is bored out in line with the rocker rail, to receive the pivot pin 20. The pin 20 has a conical point at its inner and a conical female center at its outer end. The ends of the rails 12, 14, within the hollow frames 19, have conical female centers adapted to take in the conical points of the pins 20; and the outer ends of the frames are bored out in line with the pins 20, and threaded and provided with the pivot screws 21, having conical points which are arranged and adapted to be inserted into the outer, female centers of pins 20. In this manner the screws 21, pins 20 and rails 12, 14 (as the case may be) are all brought into line with and engage each other when the screws 21 are inserted deep enough into the frames 19 to take up the end play of the rails 12, 14; and the device preserves accurate spacing between the letters by preventing such end play. Jam nuts 22 are provided for firmly securing the screws 21 in place after they have been inserted to the proper depth to take up such end play, and set screws 23 are also provided to hold the pins rigidly in place in the brackets 11 and 13. This arrangement provides accurate and easy running pivots for the rocker rails, as well as a positive and convenient means for taking up the looseness ordinarily caused by wear in the typewriting machine from long continued use. It further provides a convenient means for shifting the guide rails endwise in the machine when this is desirable for any purpose, as say for instance, to alter the position of the carriage margin stop.

The rails 12, 14 are both provided with dependent rocker arms 24 near each end, and the two arms 24 on each side of the machine are linked together at their lower ends by the links 25. This device constitutes a parallel rocking movement, whereby, when the front rail 14 is rocked, the rocking movement is transferred to the rail 12 which is thus caused to rock to an equal extent.

Figure 1:
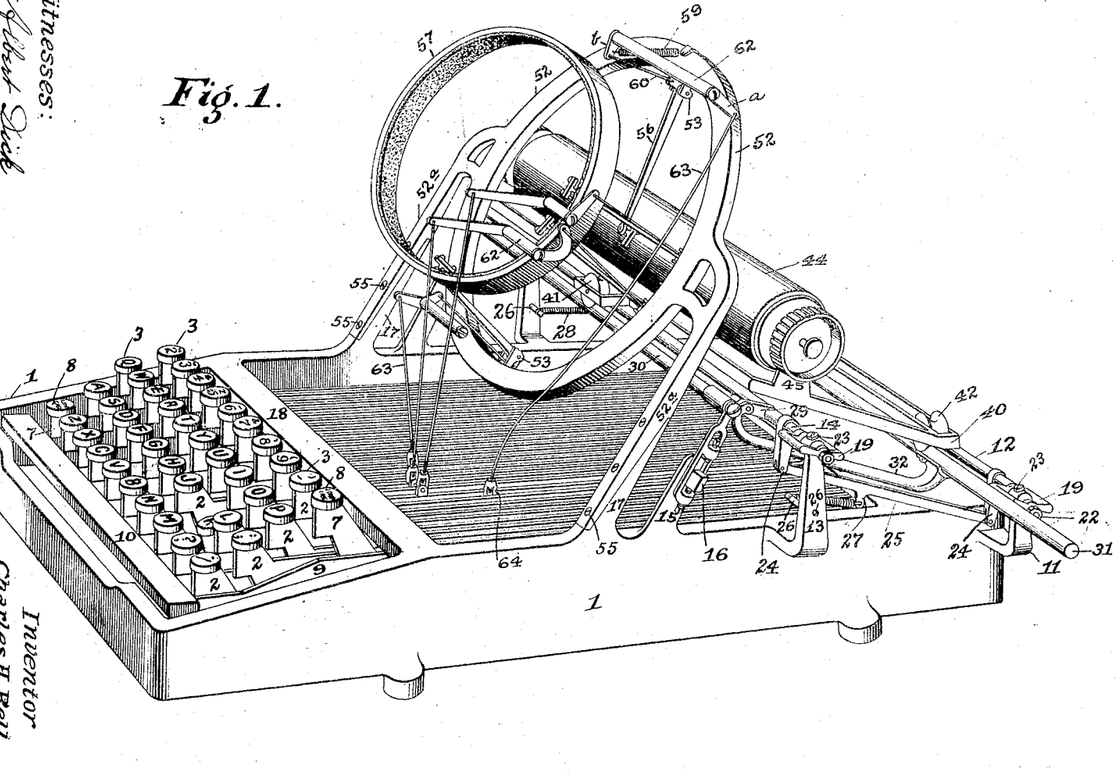
Figure 1 is a perspective view of the machine, with many parts removed.
Figures 3, 4:
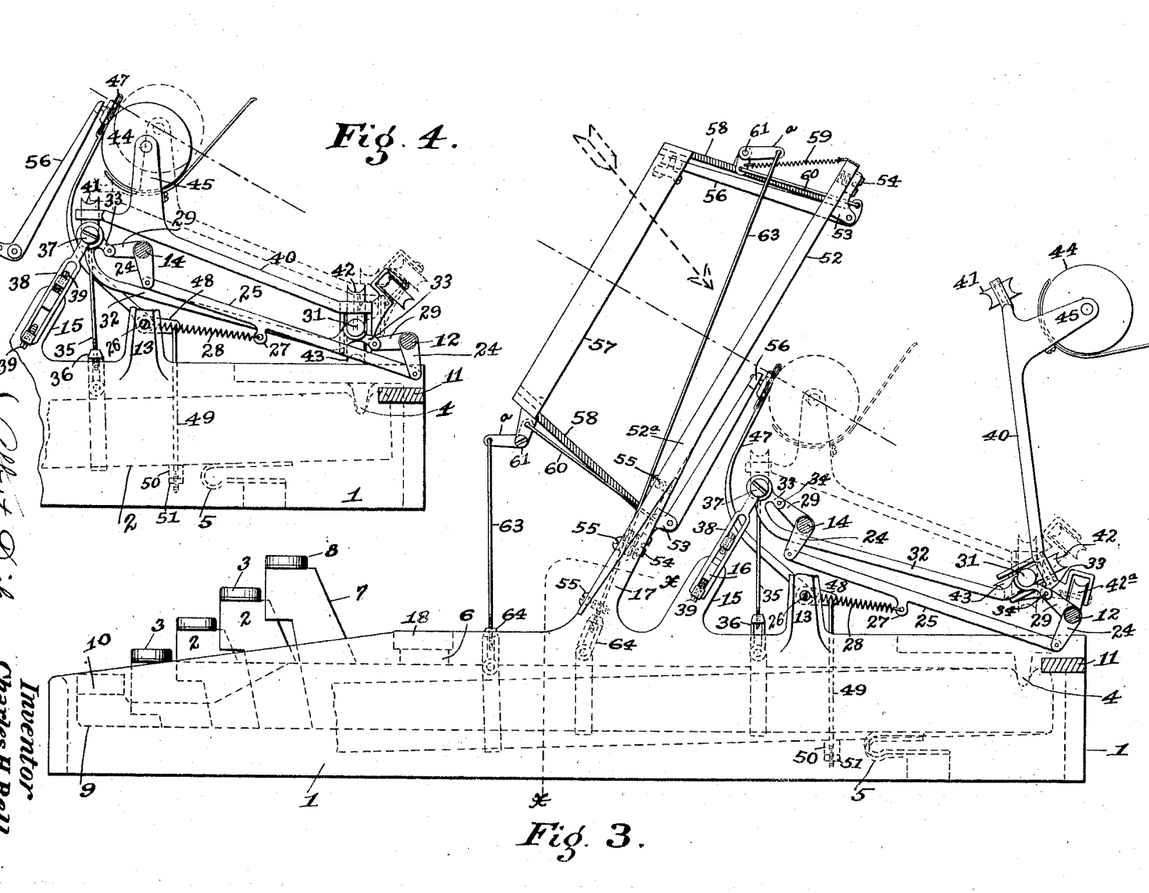
Fig. 3 is a side view of the machine, with many parts removed or broken away. In the view the carriage is shown in full lines in its lifted, inspection or correction position, and in dotted lines in its lower case printing position, with one of the type bars and the interposed ribbon mechanism at the printing point.
Fig. 4 is a detail of the machine shown in Fig. 3. In this view the carriage is shown in full lines in its upper case printing position, and the higher printing position, which it assumes for lower case printing, is indicated by dotted lines. A type bar and the ribbon holding and guiding mechanism are shown at the printing point.

Each of the brackets 13 has an inwardly extending pin 26 and each link 25 has a dependent lug 27 and a spiral spring 28 is attached at its front end to the pin 26 and at its rear end to the lug 27 at each side of the carriage; the two springs 28 being thus held constantly under tension, tend to normally draw the links forward and to thus hold the rocker arms 24 in their normal, forward position, shown in Figs. 1 and 3. A short distance inside of the dependent arms 24 each rail 12, 14 is provided, at either side of the carriage, with a forwardly extending rocker arm 29; there being two such arms to each rail or four in all.

The carriage supporting and shifting frame comprises the front guide and shift rail 30, the rear guide and shift rail 31, and the two side bars 32 to which both the guide rails are rigidly secured and which serve to connect them together. The front and rear guide rails have short, rearwardly extending lugs at either side of the machine, which at their rear ends are slotted to receive the front ends of the rocker arms 29, to which they are hinged by means of small pins 34 fastening them together and permitting a buckling movement between them. Thus when the front carriage guide and shift rail is depressed from its lower case position, shown in Fig. 3, to the upper case shifted position, shown in Fig. 4, the rocker arms 29 of the front rocker rail 14, will be swung downwardly from the position of Fig. 3 to that of Fig. 4, thus rotating the front rocker rail 14 and swinging the dependent arms 24 rearwardly together with the links 25, and thereby, through the arms 24 of rail 12 and the forwardly extending arms 29 thereof, swinging the guide rail 31 from its lower case position in Fig. 3 to its upper case shifted position in Fig. 4.

I have shown the arms 29 of both rails equal in length and parallel with each other; and the dependent arms 24 of both rails equal in length and parallel with each other; and it therefore follows that the shifting movement of the carriage supporting and shifting frame will be a parallel movement, as indicated by the dotted line position of the carriage in Fig. 4 which it will be seen is parallel with the full line position thereof in the same figure. Thus the key levers are in the horizontal plane of the machine, while the carriage and the carriage supporting and shifting frame are shown inclined at an oblique angle thereto; but since the carriage and shifting frame are shifted by a parallel movement, their plane will be of the same obliquity in the normal, lower case position of Fig. 3, as in the shifted, upper case one of Fig. 4. The shifting movement of the carriage, and the carriage supporting and shifting frame is parallel with the plane of the front and rear rocker rails 12 and 14, or with that of the front and rear carriage guide rails 30 and 31; while the dependent arms 24 vibrate through arcs substantially at angles thereto. The shifting movement of the carriage is also parallel to the plane in which the type bars are pivoted.

The carriage supporting and shifting frame is spring pressed normally to its upper position (which is the lower case one) by means of the springs 28; and it is depressed to its lower position (which is the upper case printing one) by means of the shift key levers 7, which are connected with the front carriage guide and shift rail 30 by means of connecting wires 35, which are adjustable in length by the usual turn buckles 36. Means are provided for accurately adjusting the carriage supporting and shifting frame in both directions as follows: Into each end of the shift rail 30 there is threaded a shouldered screw 37, of smaller body diameter than that of the rail, and upon these screws are pivotally hung the upper ends of the sliding links 38. These links are slotted at their lower ends and take over the stationary lugs 16 of the brackets 15. Each link is provided with bosses above and below the lugs 16, and into these are threaded the adjusting screws 39, which by contacting with the lugs 16, the one below and the other above the lug, determine respectively, the lower case and the upper case printing positions of the carriage. By means of the adjustability of the screws 39 the case printing positions of the carriage can be regulated to a nicety.

The carriage comprises an open, rectangular frame 40, having a roller 41 journaled thereon, which runs at the front of the carriage, on the rail 30. At the rear of the carriage frame two rollers 42 are journaled, one at each side, which run on guide and shift rail 31. The carriage frame is also provided at the rear with a third roller 43, whose function is to maintain the carriage frame at all times in its engagement with the shift rail 31; and to form in conjunction with the rollers 42, a hinge joint whereby the front end of the carriage may be swung up off the rail 30 by hand to raise the carriage to its elevated, inspection and correction position, shown in full lines in Fig. 3.

The usual platen 44 is supported on the upwardly extending arms 45 of the carriage frame, being journaled in the upper ends of the arms; and in the shifting movement from lower case to upper case printing position and vice versa, it is movable transversely to the line of its endwise travel and obliquely to the horizontal plane of the machine, as well as in a plane which may be coincident with or parallel to the plane in which the type bar pivots are situated; and means, above described, are provided for so shifting the platen with the carriage, at will at all points in the line of its endwise travel. It will be seen, by an inspection of the drawings, that the printing point is on a line at the upper front side of the platen, in view of the operators; that the shifting movement of the platen is in an oblique plane, shown as parallel to the oblique plane in which the type bars are pivoted; and that there are connections between the platen and the shift keys constructed and arranged to enable the platen to so shift to its two printing positions.

Pivotally mounted on the inner ends of the pins 26 is the ribbon supporting rocker shaft 46. This shaft is provided with a forwardly and upwardly extending arm 47 which, at its upper end is formed into a ribbon supporting slot and guide. Through this guide there passes a ribbon which is adapted to be vibrated, by the rocking of the shaft 46, to the platen for printing, upon the depression of the keys, and away therefrom and out of the line of vision to expose the letters to view as soon as they have been written. The line of vision is shown through the type bar ring, but I do not intend to limit my claims to a ring of type bars.

The rock shaft is provided, near each end, with short horizontal arms 48, extending rearwardly, which at their rear ends are connected by the connecting wires 49, with the universal ribbon operating bail 50, so as to vibrate the ribbon to the printing point in advance of the type. In order to accurately time the movement of the ribbon guide the lower ends of the connecting wires 49 are threaded and fitted with nuts 51 beneath the bail 50 to adjust the lengths of the connecting wires.

My type bar system comprises the type bar plate or ring 52 and all the parts mounted thereon. This plate is mounted in a plane oblique to the horizontal plane of the machine and substantially parallel to the plane through which the platen vibrates from one printing position to the other; and it comprises the central ring to which the type bar hangers 53 are rigidly fastened by the hanger screws 54, in the usual manner, concentrically about the printing point. It also comprises the two dependent arms $52^a$, which, as shown, are cast integral with the ring plate 52, and serve as the supports for maintaining the type bar ring rigidly in its proper place in the machine. The arms $52^a$ are notched or shouldered downwardly at their lower ends to fit onto the tops of the supporting brackets 17, which are similarly notched upwardly; the two being fastened together by the screws 55.

Pivotally mounted in the hangers 53 are the type bars 56. These bars are all arranged concentrically about the printing point and are normally inclined away from the platen, toward the front of the machine, and are constructed and adapted to strike rearwardly thereto. Some of the type bars strike rearwardly and down to the printing point; some of them strike rearwardly and up thereto, and some of them strike rearwardly and crosswise the machine,—depending on the positions of the several type bars in the type bar ring. The type bars are all similar to each other and they are preferably similar to the type bars in a Remington typewriter; and, in fact, a set of type bars and their hangers might be removed bodily from a Remington machine and placed in my herein machine, and they would fit and operate accurately therein. They are therefore preferably pivoted in my machine in a circle of the same diameter as that of the Remington typewriter. I wish, however to have it understood that, while I have shown this particular arrangement of bars I do not intend to limit the other features of the invention to such arrangement, as I may of course use type bars of different lengths from those of the Remington machine and pivot them in a circle, or in a segment less than a whole circle, of different diameter than that of the Remington, or arrange the bars in some other line than a circle, as say for instance that of said Patent No. 758,252.

The usual buffer ring 57 is mounted on the type bar plate, being supported thereon by the arms 58 at either side of the machine. The type bar springs 59 may, if desired, be employed to aid in restoring all of the type bars to their normal positions after they have been operated. Such springs are of especial value in connection with the type bars which are located in the upper part of the ring, because those bars have to be raised to their normal positions against the force of gravity.

Figure 8:
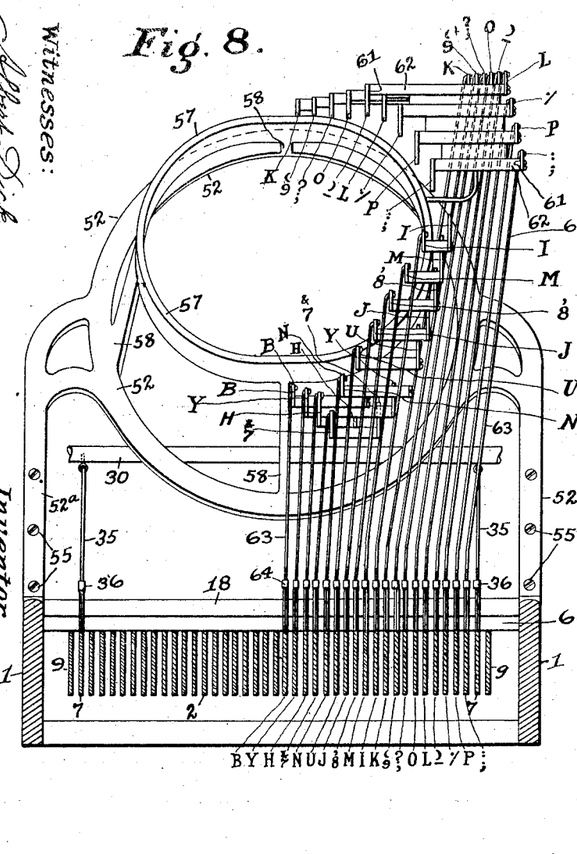
Fig. 8 is a sectional front view taken through the machine in front of the system of connecting wires and rock shafts, which illustrates the type bar system and the method of attaching it to the base frame. This view shows the system of connecting wires from the key levers to the rock shafts, and the rock shafts, on one side of the machine; the corresponding set or system of connecting wires on the opposite side of the machine being removed, together with the rock shafts, and none of the type bars nor their connecting wires being shown.

Since the key lever system in my machine is, as stated, preferably of a width the same as that of the Remington key lever system, and since the type bars are also preferably of the same length as, and pivoted in a circle of like diameter as that of the Remington, it follows that the key lever system in my machine is considerably wider than the diameter of the circle in which the type bars are pivoted, because this fact is true of the Remington machine. On the other hand the extreme width of my type bar system is the width between the arms 52ª, 52ª at the sides of the machine; and this width is considerably greater than that of the key lever system, as clearly appears from an inspection of the drawings. I take advantage of these differences in connecting my key levers to the type bars, as will appear from the following description: To the short, operating arm of each type bar I hook the rear, lower end of a connecting wire 60, which extends forwardly and upward in a direction substantially parallel with the normal position of the long type bearing arm of the type bar. The front or upper end of each type bar connecting wire 60 is hooked to the free end of a rocker arm b at one end of type bar rock shaft 61. The rock shafts 61 are pivotally mounted in tubular bearings 62, which latter are fixedly mounted (by supports or brackets, not shown, that connect them rigidly to the type bar plate 52, buffer ring 57 or buffer ring supporting arms 58, in any convenient manner), on the type bar system in horizontal planes transverse the machine. The several rock shafts 61 are thus mounted in transverse, horizontal planes, at different levels convenient for attachment to the corresponding several type bars, as is clearly shown in Figs. 8 and 9, which show the whole series of rock shafts and connecting wires on one side of the machine. The corresponding series on the opposite side of the machine (not shown) is arranged in a substantially similar manner. I extend a connecting wire 63 upwardly from each key lever to a rocker arm a on each rock shaft 61, to connect each key lever with its type bar. Each rock shaft 61 is provided with two rocker arms a, b, so arranged and constructed that upon the depression of a key lever the connected type bar will be positively driven thereby to the platen to print, and upon the return of the depressed key lever to its raised, normal position, the connected type bar will be positively restored thereby to its normal position.

Figure 9:
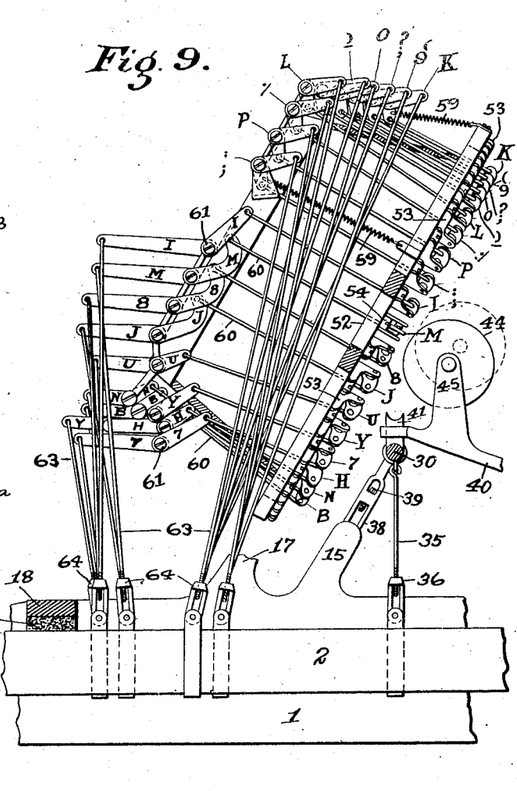
Fig. 9 is a sectional side view of the system of connecting wires from the key levers to the rock shafts and of the rock shafts, of Fig. 8. In this view there is also shown the system or set of connecting wires from the rock shafts to the type bars, and the short connecting arms of the type bars; but the long, type bearing arms of the type bars are not shown. In this view, also, a portion of the frame of the type bar system is shown, and the platen and a part of the carriage are shown to illustrate their relation to the type bar system and the fact that the platen is shifted from lower case position to upper case position, in a plane parallel to that in which the type bar pivots are situated.

As will be seen in Fig. 9, the rocker arms a, b of the several rock shafts are of many different lengths and shapes; the purpose of this being for convenience in locating the several rock shafts, and in order to equalize the extent of depression of the several keys in printing, and to obtain the clearance room necessary and convenient for the several parts and for operating them without collisions. In my machine the connections from the several key levers to the corresponding type bars are preferably so proportioned and constructed that each key will be depressed to an equal extent to drive its connected type bar from its position of rest to the printing point at the platen. As shown, also, the rocker arm a of each rock shaft is longer than the arm b of the same shaft. As the key levers connected with the keys of different banks are of different lengths, but all fulcrumed in one line on bar 4, and as the turn buckles 64 are connected with the key levers at different distances from the common fulcrum bar, the corresponding lengths and proportions between the arms a, b are preferably varied in the several rock shafts to compensate for these variations and thus to give an equal dip to each key for printing. The lower ends of the several connecting wires 63 are threaded into the turn buckles 64, in the usual manner, and are thus adjustable and may be nicely regulated in length as desired. By means of my system of rock shafts 61 I am also enabled to change the order of connections from the key levers to the type bars, so that the type bars in the upper half of the type bar ring will be connected to the key levers at the sides of the machine, and those in the lower half of the ring with the centrally located key levers. The rock shafts also provide a means for transposing the connections of key levers next adjacent to each other to type bars which are not so adjacent, as for avoiding collisions in rapid writing between letters which are frequently next each other in words. I accomplish these results by varying the lengths of the rockshafts with respect to each other and by correspondingly varying the levels at which they are respectively situated, etc.; and by placing the arm a at the right hand end of the rock shaft in some cases, and on the left hand end in other cases on the same side of the machine, the arm b being in these cases on the opposite end of the shaft. In other cases I locate both arms a and b on the same end of the shaft, leaving the opposite end without any rocker arm. I thus connect the series of type bars in the upper, right hand quarter of the circle in the type bar ring, with the group of key levers, from ";" to K, at the outer right hand quarter of the key lever system; and the series of type bars in the lower right hand quarter of the circle with the group of key levers, from I to B, at the right hand central quarter of the key lever system. While I have not shown the corresponding system of connections at the left hand side of the machine, they are substantially similar to those of the right hand side, as is indicated by the turn buckles 64 on the key levers in Fig. 2.

For the purposes of illustration and description it will be convenient to divide my entire set of type bars into two groups or series, namely: one series of type bars comprising all those which are located in the upper half or segment of the type bar ring. These are the bars which are connected with the key levers from ";" to K on the right hand side of the machine, and from Q to E on the left hand side of the machine. The other group or series comprises all those which are located in the lower half or segment of the type bar ring and which are connected with the key levers in the central part of the machine, namely from I to D inclusive. The first mentioned series, or that in the upper half of the ring, is of considerably less width than the system of key levers with which it is connected. Hence, in this series, I connect the inner ends of the rock shafts 61 (*i. e.*—those nearest the center of the machine), with the type bar connecting wires 60, so that in the upper series the arms $b$, on the rock shafts at the right hand side of the machine (*i. e.*, those shown in the drawings) are on the left hand ends of the rock shafts; while on the rock shafts (not shown) on the left hand side of the machine, will be placed on the right hand ends of the rock shafts in order to bring them in line with their type bars. In this way I am enabled to arrange each type bar connecting wire in a direction substantially parallel with the type bearing arm of its type bar and at right angles to the type bar pivot, so as to secure a direct pull on the bar and to avoid straining sidewise on the pivot. In the same series (*i. e.*, the bars in the upper half of the ring) I locate the arms $a$ at the outer ends of the rock shafts, and make the rock shafts of such lengths as to bring each arm $a$ nearly vertical above its key lever. Thus there is, in each instance, a substantially straight pull from the key lever to the rock shaft and thence to the connected type bar.

In order that all of the connecting wires 63, from the upper series of type bars, may have the necessary clearance room beyond the sides of the type bar ring, to unobstructedly extend from the outer ends of the rock shafts 61 to the key levers, I may make the rock shafts of such length that they will extend sidewise somewhat beyond the key levers with which they are connected, so that the connecting wires will flare outwardly slightly from their lower ends to the top ends. Such flaring will not, however, be sufficient to interfere with the proper action of the key levers.

The lower series of type bars (*i. e.*, those connected with the key levers from I to D) is of considerably greater width than that of the series of key levers with which it is connected. Hence I reverse the order of the connections in this series. That is, I place the arms $b$ at the outer ends of the rock shafts (*i. e.*, those nearest the sides of the machine) and the arms $a$ on the inner ends of the rock shafts, or toward the center of the machine; excepting that near the center of the key lever system the type bars are practically in line with their key levers, and therefore on some of the rock shafts I place both the key lever connecting arm $a$ and the type bar connecting arm $b$ at the inner end of the shafts, in line with each other and with their type bars and connecting wires and key levers. Thus the rock shafts for the letters B and N have both arms $a$, $b$ at the inner ends of the shafts. In this case the shaft is merely provided to give length of bearing.

Figures 10, 10A, 10B, 11, 11A, 11B, 12:
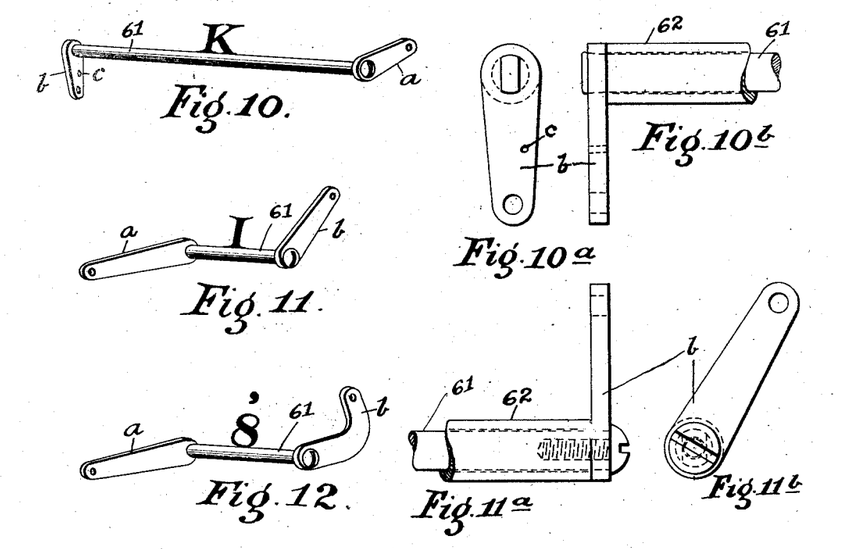
Figures 11C, 11D:
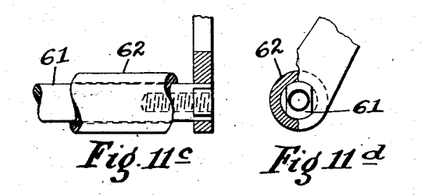
Figure 13:
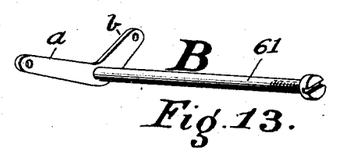
Fig. 13 is a similar view of the rock shaft for the B type bar.
Figures 13A, 13B:
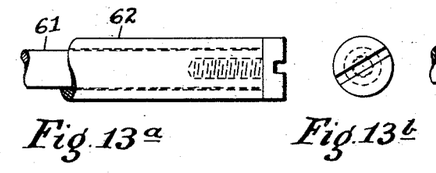
Figures 13C, 13D:
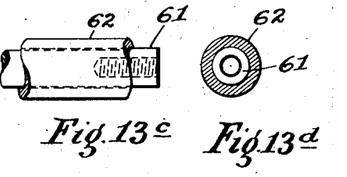

A rock shaft of the first mentioned class—*i. e.* one in which the inner end connects with the type bar and the outer end with the key lever,—is shown in enlarged perspective view in Fig. 10; and it is there seen that the key lever rocker arm points rearwardly and up, while the type bar connecting arm $b$ points forwardly and down; this arrangement of the two arms being made so that the arm $b$ will incline or point toward the center of the type bar ring. This arrangement of the two arms is practically reversed in the B rock shaft (Fig. 13), the key lever arm $a$ of which points forwardly and the type bar arm $b$ rearwardly, so that the arm $b$ will incline or point toward the center of the type bar ring in line with the type bearing arm of its bar B. The location of the type bars K and B on opposite sides of the type bar ring causes this reversal of the arms on the two connected rock shafts; and it will be seen that the arms $a$, $b$ are correspondingly arranged, according to the location of their several bars, on each rock shaft.

In those rock shafts having arm $a$ at one end of the shaft and arm $b$ at the opposite end, I machine a tongue on the inner end of the shaft and punch a corresponding perforation on the rocker arm to take over the tongue, so that I can thus rigidly rivet the two together, as shown in Figs. 10ª and 10ᵇ. I also machine a tongue on the outer ends of the same shafts, and correspondingly perforate the outer rocker arms. But instead of riveting the two together, I fasten them detachably together by means of a screw, as shown in Figs. 11ª, 11ᵇ, 11ᶜ and 11ᵈ. By this arrangement I am enabled to readily insert and secure all of the rock shafts in their bearings, as well as to remove any of them therefrom when desired.

A small hole $c$ is shown in the arm $b$ of rock shaft K, this serving to connect one end of the type bar spring 59 with the rock shaft, the opposite end of the spring being connected with a lug on the type bar plate 52. Both rocker arms are perforated at their free ends for the connecting wires.

In Fig. 12 it will be seen that the type bar rocker arm $b$ on the rock shaft for the type bar printing 8 is curved upwardly at its free end. The reason of this is for clearance purposes (as will be seen from an inspection of Figs. 8 and 9), to bring its connected end in line with the type bar which prints 8; and so that it can operate that bar without interference with the rock shaft for the type bar printing the character M, which is located next above it. The clearance bend is such that it encircles the adjacent rock shaft when it is operated. Several of the rocker arms b at either side of the machine are thus curved for the same purpose.

The key levers O and L are next adjacent to each other in the key lever system; but, as the letters O and L very frequently occur next to each other in words, I have separated their type bars in the type bar plate 52 so that they will not collide with each other in the writing operation at high speed. I do this by making the L rock shaft shorter than its natural length in its series, and the rock shaft for the type bar printing "-" longer than its natural length in the series, so that the rock shafts will aline with the type bars in the reverse order, and so that I can thus pivotally mount the type bar for "-" between the bars for O and L. Therefore while the order of the three key levers in the key lever system is O, L, -, the order of the type bars on the plate 52 is O, -, L. That is, I interpose the type bar printing "-" between those printing O and L respectively, and so avoid collisions. In a substantially similar manner I have arranged to avoid collisions between the type bars printing the letters U and N, and between those printing the letters B and Y; the order of the key levers being B, Y, H, 7, N and U, and the order of the connected type bars being B, N, H, 7, Y and U. Other collisions can be similarly broken up, at will, by the use of my system of rock shafts.

My type bar system (i. e., the plate 52, rock shafts 61, type bars 56, type bar connecting wires 60, type bar springs 59, etc.,) is so arranged and constructed, as shown, that it may be completely assembled and adjusted before being mounted in the machine. The key lever connecting wires constitute an element of the key lever system and serve to operatively and positively connect the key levers with their type bars, and to properly adjust them thereto.

Figure 2:
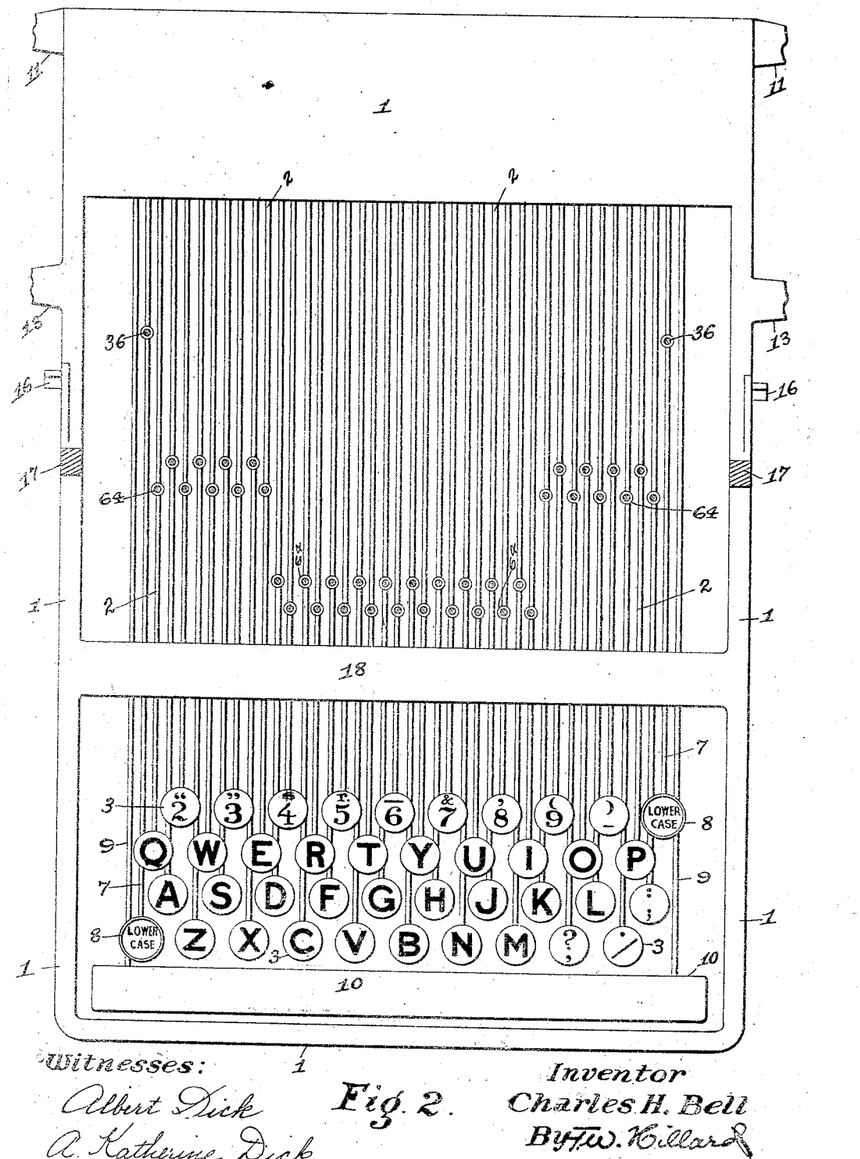
Fig. 2 is a plan view of the base frame and system of key levers therein.

By an inspection of Figs. 2 and 9 it will be seen that I connect the turn buckles to the type bars in three double rows transverse the machine and thus all parallel with each other. Two of the rows are on opposite sides of the machine and in line with each other, while the third row is in the central part of the machine and nearer the key board. The central row is connected with the series of type bars that is pivoted in the lower semi-circle in the type bar plate, embracing the bars from I to D inclusive; while the two rows at the sides of the machine are connected with the series of bars in the upper semi-circle, namely from ";" to K and from E to Q. The turn buckles are thus connected with the type bars in three rows in order to bring the connecting wires 63 at about right angles to the connected arms a of the rock shafts; and the reason why the central row is nearer the key board than the side rows is because of the obliquity of the type bar plate, whereby the lower series of type bars is brought farther forward in the machine than the upper series in the type bar plate. The turn buckles are all connected to the key levers in double or staggered rows for clearance purposes; that is, in order to allow more room for manipulating them while being assembled with the type bar system, as well as to lessen the danger of interferences when the machine is being operated.

I contemplate so arranging the arms a and b on the rock shafts 61 that, on the depression of the keys at a uniform rate throughout the stroke, the connected type bars will be driven to print at a rate which gradually accelerates in speed from their normal positions at the beginning of the stroke to their printing position at the end of the stroke. This tends to ease of operation in the manipulation of the keys in printing. I thus accelerate the speed of the bars while the speed of the key depression, which drives them, remains uniform, as follows: I place the arm a on the rock shaft in such position that, at about the half depression of the key, the rock shaft arm a will be substantially vertical to the key lever connecting wire 63; while the arm b is so placed on the shaft that it is approaching toward a position vertical to the type bar connecting wire 60 throughout the entire depression, and only arrives at such position on the total depression of the key.

It will be understood that my rock shaft system is applicable as well for use in machines in which all of the type bars are pivoted in a segment less than a whole circle (as say for example the well known Underwood typewriter,) as in my herein machine employing a segment constituting a whole circle for the type bars. Or they may be employed in a machine in which the type bars are pivoted in a line other than that of a circle, as for example the machine shown in said Patent No. 758,252, above referred to.

While I have shown the carriage and type bar system mounted in a plane oblique to the horizontal plane of the machine, it will be understood that I do not limit my broader claims to such oblique structure, since the carriage and type bar systems, in many front strike typewriters, are mounted respectively in horizontal and vertical planes, and my invention is broadly applicable thereto. Nor do I limit my rock shafts to use with type bars having each a plurality of printing characters, as the shafts are equally applicable to use with type bars having only one printing character each.

Many changes might be suggested without departing from the spirit of my invention and I do not, therefore, intend to limit myself to the details shown.

Having thus described my invention, what I claim and desire to secure by Letters Patent is:

1. In a front strike typewriter, the combination, with the carriage, of a plurality of key levers mounted in the base frame of the machine, a plurality of type bars pivoted in front of the platen, normally extending toward the front of the machine and arranged to strike rearwardly to the platen, a plurality of tubular bearings extending in a horizontal direction in the machine, a plurality of rock shafts journaled in said tubular bearings, and each provided with a rocker arm at one end for connection to one of said key levers and with a second rocker arm at the opposite end for connection to one of said type bars, and operative connections between the several key levers and their rocker arms and between the several type bars and their rocker arms.

2. In a front strike typewriter, the combination, with the carriage, of a plurality of key levers mounted in the base frame of the machine, a plurality of type bars pivoted in front of the platen, normally extending toward the front of the machine and arranged to strike rearwardly to the platen, a plurality of intermediate rock shafts journaled in horizontal planes transverse the machine and each provided with two rocker arms, one at each end beyond the bearing in which it is journaled, and a clearance bend on one of the said arms arranged to encircle an adjacent rock shaft, and operative connections from each key lever to its rock shaft and thence to the corresponding type bar.

Signed by me at Thomaston, Conn., this 26th of August, 1905.

CHARLES H. BELL.

Witnesses:
F. I. ROBERTS.
RICHARD G. DAVIS.

Copies of this patent may be obtained for five cents each, by addressing the "Commissioner of Patents, Washington, D. C."